US012688329B2

(12) United States Patent
Sarkisian et al.

(10) Patent No.: US 12,688,329 B2
(45) Date of Patent: Jul. 21, 2026

(54) INFORMATION PROCESSING DEVICE, INFORMATION PROCESSING METHOD, AND STORAGE MEDIUM

(71) Applicant: HONDA MOTOR CO., LTD., Tokyo (JP)

(72) Inventors: Alan Robert Sarkisian, Wako (JP); Manuel Dietrich, Offenbach/Main (DE)

(73) Assignee: HONDA MOTOR CO., LTD., Tokyo (JP)

( * ) Notice: Subject to any disclaimer, the term of this patent is extended or adjusted under 35 U.S.C. 154(b) by 33 days.

(21) Appl. No.: 18/783,467

(22) Filed: Jul. 25, 2024

(65) Prior Publication Data

US 2025/0111079 A1 Apr. 3, 2025

(30) Foreign Application Priority Data

Sep. 29, 2023 (JP) ................................. 2023-168980

(51) Int. Cl.
 G06F 21/00 (2013.01)
 G06F 21/62 (2013.01)
(52) U.S. Cl.
 CPC ................................ G06F 21/6245 (2013.01)
(58) Field of Classification Search
 None
 See application file for complete search history.

(56) References Cited

U.S. PATENT DOCUMENTS 11,138,974 B2 10/2021 Wang
11,436,380 B2 * 9/2022 Lawrenson ......... G06F 21/6245

| 12,299,180 | B1 * | 5/2025 | Guerra ..................... G06F 21/62 |
| 2014/0026184 | A1 | 1/2014 | Pergament et al. |
| 2017/0103679 | A1 | 4/2017 | Campbell et al. |
| 2019/0253269 | A1 * | 8/2019 | Keane ................. H04L 63/0254 |
| 2019/0273702 | A1 * | 9/2019 | Zweig ..................... H04L 51/02 |
| 2019/0366557 | A1 * | 12/2019 | Gewickey ............. G06N 3/008 |
| 2021/0192651 | A1 * | 6/2021 | Groth ..................... G06N 20/20 |
| 2022/0036708 | A1 * | 2/2022 | Rey .......................... G06F 21/84 |
| 2022/0199079 | A1 * | 6/2022 | Hanson ................... H04L 51/02 |
| 2022/0383896 | A1 * | 12/2022 | Hajiyev ................. G10L 25/72 |
| 2023/0223026 | A1 * | 7/2023 | Grichnik .............. H04L 51/216 704/235 |
| 2024/0103677 | A1 * | 3/2024 | Mckenzie ............... G06F 3/011 |

(Continued)

FOREIGN PATENT DOCUMENTS

| JP | 2014-515855 | 7/2014 |
| WO | 2022/102891 | 5/2022 |
| WO | 2023/017753 | 2/2023 |

OTHER PUBLICATIONS

Extended European Search Report for European Patent Application No. 24192830.8 dated Jan. 30, 2025.

(Continued)

*Primary Examiner* — Shin-Hon (Eric) Chen

(74) *Attorney, Agent, or Firm* — Amin, Turocy & Watson, LLP

(57) ABSTRACT

An information processing device includes a score calculation unit configured to calculate a group trust score indicating a relationship among a plurality of users in a group in which at least two users are present from a plurality of different trust levels and change a user information handling level on the basis of the group trust score.

8 Claims, 14 Drawing Sheets

(56)    References Cited

U.S. PATENT DOCUMENTS

2024/0342901 A1    10/2024  Gomez

OTHER PUBLICATIONS

Tang, et al. "Confidant: a Privacy Controller for Social Robots", Arxiv.org, Cornell University Library, 201 Olin Library Cornell University Ithaca, NY 14853, Jan. 8, 2022 (Jan. 8, 2022), XP091131916.
Japanese Office Action for Japanese Patent Application No. 2023-168980 mailed Apr. 1, 2026.

* cited by examiner

FIG. 3

| Individual G is a… | Final Score $(t_s, t_f, t_p)$ |
|---|---|
| Work Colleague of H | (0.2, 0.0, 0.7) |
| Sibling of H | (0.5, 0.8, 0.0) |
| Next door neighbor of H | (0.7, 0.0, 0.0) |
| An unknown stranger to H | (0.0, 0.0, 0.0) |

FIG. 4

| Gathering Setting | Gathering Type | Final Score |
|---|---|---|
| Office Setting | Professional | (0.0, 0.0, 1.0) |
| School Setting | Professional or Social | (0.5, 0.0, 0.7) |
| Home Setting | Family or Social | (0.7, 0.7, 0.0) |
| Public Function Space | Social | (1.0, 0.0, 0.0) |

FIG. 5

| USER ID | PRIVACY POLICY | | | | | IMAGE INFORMATION | SOUND INFORMATION |
|---|---|---|---|---|---|---|---|
| | USAGE LOCATION | AGE | PROFESSION | GENDER | … | | |
| IDXXX1 | | | | | … | | |
| IDXXX2 | | | | | … | | |
| … | … | … | … | | … | | |
| IDXXXn | | | | | | | |
| … | | | | | | | |

| USER ID | PRIVACY POLICY | | | | IMAGE INFORMATION | SOUND INFORMATION |
|---|---|---|---|---|---|---|
| | SHARING | HOLDING | LEARNING | ... | | |
| IDXXX1 | ALLOWED | ALLOWED | ALLOWED | ... | | |
| IDXXX2 | ALLOWED | DISALLOWED | DISALLOWED | ... | | |
| ... | ... | ... | ... | ... | | |
| IDXXXn | | | | | | |
| ... | | | | | | |

FIG. 16

| Host | Contact | social trust | familial trust | professional trust | RMS |
|------|---------|--------------|----------------|--------------------|-----|
| A | B | 0.125 | 0.216 | 0.66 | 0.40738229 |
| B | A | 0.027 | 0.242 | 0.732 | 0.44539009 |
| B | C | 0.642 | 0.02 | 0.338 | 0.41904972 |
| C | E | 0.095 | 0.353 | 0.553 | 0.38272836 |
| C | D | 0.005 | 0.696 | 0.299 | 0.43735645 |
| C | A | 0.021 | 0.662 | 0.317 | 0.42393946 |
| E | B | 0.87 | 0.12 | 0.01 | 0.50708316 | g101

FIG. 17

| host | social trust | familial trust | professional trust |
|------|--------------|----------------|--------------------|
| A | 0.0559807 | 0.30199864 | 0.49446808 |
| B | 0.48626386 | 0.17854135 | 0.55191609 |
| C | 0.20261218 | 0.61278778 | 0.49595179 |
| D | 0.00125 | 0.174 | 0.07475 |
| E | 0.35154059 | 0.13346249 | 0.14201771 |
| general | 0.22312202 | 0.28015805 | 0.35182073 | g112      g111

FIG. 18

| Host | Contact | social trust | familial trust | professional trust | RMS |
|------|---------|--------------|----------------|--------------------|-----|
| A | E | 0.5 | 0 | 0.5 | 0.40824829 |
| A | D | 0 | 0 | 0.6 | 0.34641016 |
| B | D | 0.3 | 0 | 0.7 | 0.43969687 |
| B | C | 0.8 | 0 | 0 | 0.46188022 |
| C | B | 0.8 | 0 | 0 | 0.46188022 |
| C | E | 0.6 | 0.8 | 0 | 0.57735027 |
| D | A | 0 | 0 | 0.6 | 0.34641016 |
| D | B | 0.2 | 0 | 0.8 | 0.47609523 |
| E | A | 0.5 | 0 | 0.5 | 0.40824829 |
| E | C | 0.6 | 0.8 | 0 | 0.57735027 |

FIG. 19

| host | social trust | familial trust | professional trust |
|------|--------------|----------------|--------------------|
| A | 0.39134035 | 0 | 0.65299256 |
| B | 0.8454593 | 0 | 0.45194695 |
| C | 1.14267216 | 0.51547005 | 0 |
| D | 0.19344619 | 0 | 0.82218057 |
| E | 0.89392365 | 0.51547005 | 0.30103104 |
| general | 0.7066364 | 0.20618802 | 0.44563022 | g121                                g122

INFORMATION PROCESSING DEVICE, INFORMATION PROCESSING METHOD, AND STORAGE MEDIUM

CROSS-REFERENCE TO RELATED APPLICATION

Priority is claimed on Japanese Patent Application No. 2023-168980, filed Sep. 29, 2023, the content of which is incorporated herein by reference.

BACKGROUND OF THE INVENTION

Field of the Invention

The present invention relates to an information processing device, an information processing method, and a storage medium.

Description of Related Art

In recent years, the development of social robots that communicate with users or perform a support process and the like has been underway. These social robots use user information about users to identify the users. Examples of the user information include face images, names, genders, ages, information indicating where the users live, conversations conducted by the social robots, and the like.

When communication between a social robot and a user is performed, it is necessary to pay attention to the handling of the user's privacy information. For this reason, for example, re-editing of a fragment of the user's text data with the privacy and intent of text-speech data has been proposed as a technique for generating a similar output processed for understanding. This technique refers to a procedure for re-editing or replacing with an alternative and guarantees the privacy protection of sensitive topic data (see, for example, the following Patent Document 1).

[Patent Document 1] U.S. Pat. No. 11,138,974

SUMMARY OF THE INVENTION

However, in the prior art, when a plurality of users are present, a social robot may not understand a relationship among the plurality of users. For this reason, there is a possibility that the robot will react in general without taking into account a context in which individuals in a group are likely to trust each other.

An aspect according to the present invention has been made in view of the above problems and an objective of the present invention is to provide an information processing device, an information processing method, and a storage medium capable of taking action by understanding a relationship among a plurality of users.

To achieve the objective by solving the above problems, the present invention adopts the following aspects.

(1) According to an aspect of the present invention, there is provided an information processing device including: a score calculation unit configured to calculate a group trust score indicating a relationship among a plurality of users in a group in which at least two users are present from a plurality of different trust levels and change a user information handling level on the basis of the group trust score.

(2) In the above-described aspect (1), the plurality of different trust levels may include three trust levels, i.e., a social trust level, a familial trust level, and a professional trust level.

(3) In the above-described aspect (1) or (2), the score calculation unit may change a weight of each trust level among the plurality of different trust levels in accordance with an environment of the user.

(4) In any one of the above-described aspects (1) to (3), the score calculation unit may recognize roles of the plurality of users and recognize a host role among the plurality of users on the basis of recognition results, calculate a trust score of a relationship with the host role from a user other than the host role for each pair of the other user and the host role when the host role is recognized, and calculate the group trust score on the basis of the trust score calculated for each pair.

(5) In any one of the above-described aspects (1) to (3), the score calculation unit may recognize roles of the plurality of users and recognize a host role among the plurality of users on the basis of recognition results, calculate a trust score of a mutual relationship of a pair of two users for each pair of two users from among the plurality of users when the host role is not recognized, and calculate the group trust score on the basis of the trust score calculated for each pair.

(6) In any one of the above-described aspects (1) to (5), the user information handling level may be one of allowance of use of all of the user information, allowance of use of a part of the user information, and disallowance of handling of all of the user information.

(7) In the above-described aspect (4) or (5), one of the users may be a user selected by the information processing device, and the score calculation unit may calculate the trust score of the selected user and calculate the group trust score on the basis of the calculated trust score of the selected user.

(8) In the above-described aspect (4) or (5), the information processing device may include an environmental sensor configured to detect environmental information of an environment in which the plurality of users are present, wherein the score calculation unit may estimate the environment in which the plurality of users are present on the basis of the environmental information detected by the environmental sensor, decide an environmental score for the environment in which the plurality of users are present on the basis of an estimation result, and calculate the group trust score on the basis of the decided environmental score.

(9) According to an aspect of the present invention, there is provided an information processing method including: calculating, by a score calculation unit, a group trust score indicating a relationship among a plurality of users in a group in which at least two users are present from a plurality of different trust levels and changing a user information handling level on the basis of the group trust score.

(10) According to an aspect of the present invention, there is provided a storage medium storing a program for causing a computer of an information processing device to: calculate a group trust score indicating a relationship among a plurality of users in a group in which at least two users are present from a plurality of different trust levels and change a user information handling level on the basis of the group trust score.

According to the above-described aspects (1) to (10), it is possible to take action by understanding a relationship among a plurality of users.

BRIEF DESCRIPTION OF THE DRAWINGS

FIG. 3 is a diagram showing an example of a trust score between two individuals and a group trust score.

FIG. 4 is a diagram showing an example of a gathering setting, an involved gathering type, and an example of an environmental score.

FIG. 5 is a diagram showing an example of a privacy profile stored in a storage unit.

FIG. 16 is a diagram showing an example of a subgroup trust score based on FIG. 15.

FIG. 17 is a diagram showing an example of a group trust score based on FIG. 16.

FIG. 18 is a diagram showing an example of an initial trust score in a second evaluation.

FIG. 19 is a diagram showing an example of a group trust score based on FIG. 18.

DETAILED DESCRIPTION OF THE INVENTION

Figure 1:
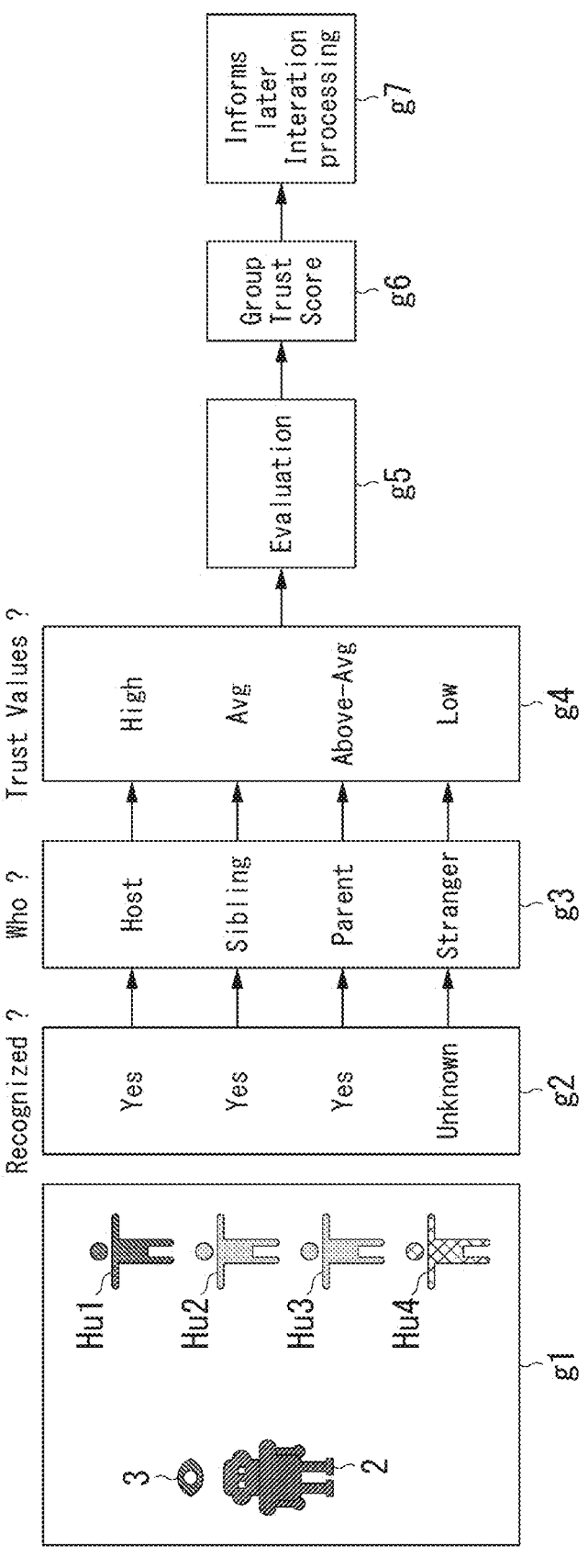
FIG. 1 is an explanatory diagram of an overview of an embodiment.

Hereinafter, embodiments of the present invention will be described with reference to the drawings. Also, in the drawings used for the following description, the scales of respective members may have been appropriately changed to make each member have a recognizable size.

In all the drawings for describing the embodiments, components having the same function are denoted by the same reference signs and redundant descriptions thereof will be omitted.

In the present application, the term "based on XX" indicates "based on at least XX" and includes cases based on another element in addition to "XX." In addition, the term "based on XX" is not limited to cases in which "XX" is directly used, and also includes cases based on "XX" on which calculation or processing has been performed. "XX" may be any element (for example, any information).
<Overview>

First, an overview of the present embodiment will be described. FIG. 1 is an explanatory diagram of an overview of the present embodiment. A robot 2 identifies a role of each of a plurality of participants (Hu1 to Hu4) within a predetermined range and a participant group trust score (group trust score) is calculated. A trust score is a score that indicates a relationship between two users, for example, a trust relationship, when at least two or more participants (users) are in a group. The group trust score is based on a trust score and is a score indicating the relationship of users in the group.

When there are a plurality of participants within a predetermined range, as indicated by reference sign g1, the robot tries to identify the plurality of participants on the basis of, for example, data detected by an environmental sensor, a sound signal acquired by a sound collection unit, and the like.

Reference sign g2 denotes an example of a recognition result. In this example, the participants Hu1 to Hu3 can be recognized (Yes) and the participant Hu4 cannot be recognized (No).

Reference sign g3 denotes an example of a result of recognizing the role of each participant. In this example, the participant Hu1 is recognized as a host, the participant Hu2 is recognized as a sibling of the host, the participant Hu3 is recognized as a parent of the host, and the participant Hu4 is recognized as a person who is not related to the host (or who is unknown to the host) (stranger). For example, after the host is recognized, a recognition unit recognizes a relationship between another participant and the host.

Reference sign g4 is an example of a trust score. In this example, the participant Hu1 has a high score (High), the participant Hu2 has an average (Avg) score, the participant Hu3 has a score (Above-Avg) above the average, and the participant Hu4 has a low score (Low). A score calculation unit calculates a trust score between the robot 2 and the participant.

Thereafter, the score calculation unit performs an evaluation on the basis of the trust score (reference sign g5). The score calculation unit decides the participant group trust score on the basis of an evaluation result (reference sign g6). The group trust score informs the interaction with participants including the robot 2 after the decision and/or the robot 2 (reference sign g7).

Each participant has a trust score between people formed from different criteria. The trust score helps explain a trust relationship with someone else. The trust score between the two is determined by a personal contact list and a trust score held for each contact. The case of two or more people includes the calculation of the group trust score. An individual trust score (not having a direct connection or relationship to a specific individual) is similar to a recommendation trust score. In the present embodiment, the group trust score is generated by processing all scores between people. Also, the group trust score helps decide the behavior, internal data processing, data sharing, and group interaction of the robot 2.
<Information Processing System>

Figure 2:
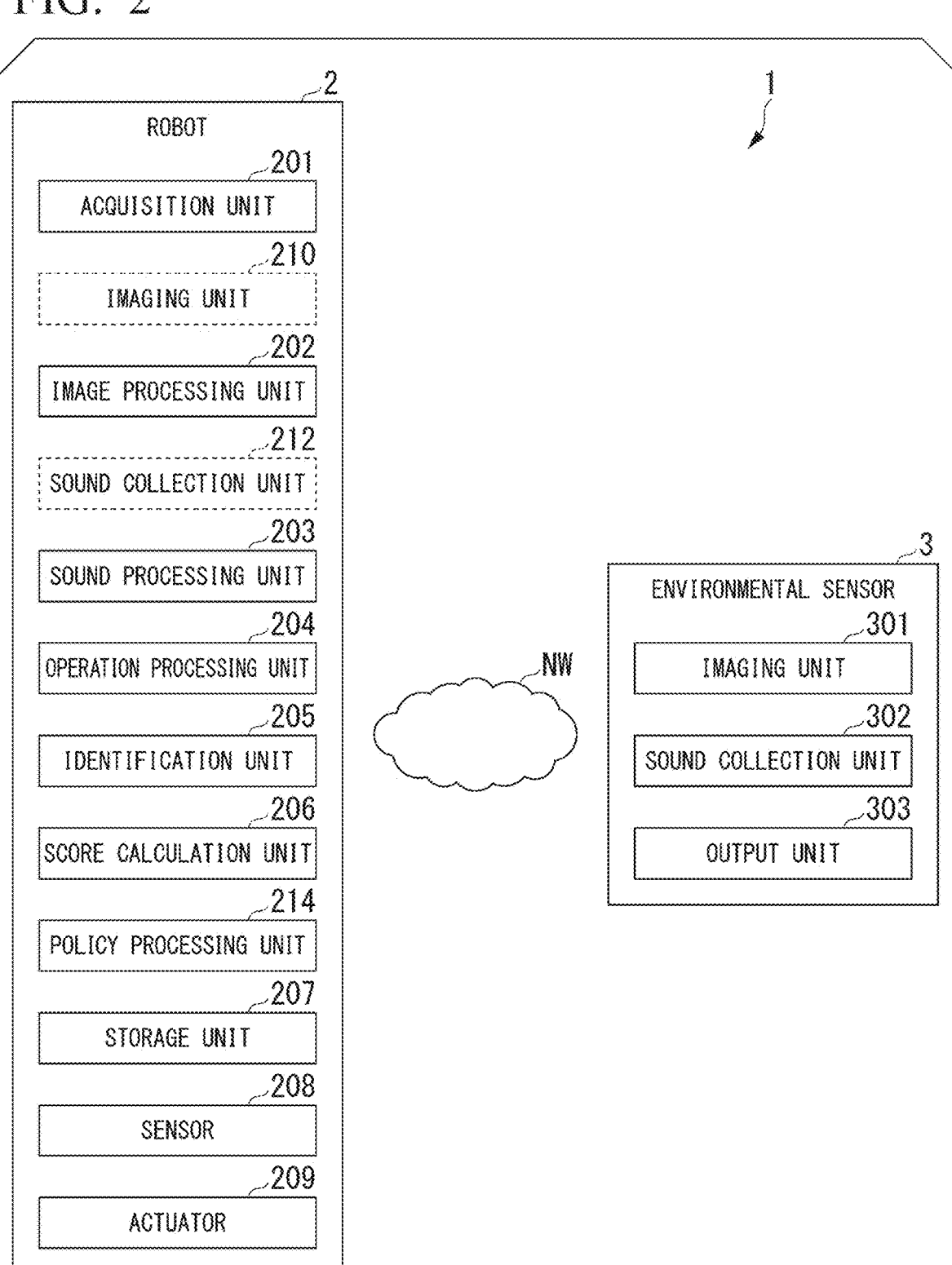
FIG. 2 is a diagram showing an example of a configuration of an information processing system of the embodiment.

Next, an example of a configuration of the information processing system 1 of the present embodiment will be described. FIG. 2 is a diagram showing the example of the configuration of the information processing system of the present embodiment.

As shown in FIG. 2, the information processing system 1 includes, for example, a robot 2 (information processing device) and an environmental sensor 3.

The robot 2 includes, for example, an acquisition unit 201, an image processing unit 202, a sound processing unit 203, an operation processing unit 204, an identification unit 205, a score calculation unit 206, a storage unit 207, a sensor 208, an actuator 209, and a policy processing unit 214. The robot 2 may include an imaging unit 210 and a sound collection unit 212. The robot 2 may include an environmental sensor 3.

The environmental sensor 3 includes, for example, an imaging unit 301, a sound collection unit 302, and an output unit 303.

The imaging unit 301 is, for example, an RBG-D imaging device capable of acquiring depth information D. For this reason, an image captured by the imaging unit 301 includes image information and depth information.

The sound collection unit 302 is a microphone and collects the user's sound signal. The sound collection unit 302 may be a microphone array including a plurality of microphones. In the present embodiment, the collected sound signal is also one item of environmental information.

The output unit 303 outputs information of an image captured by the imaging unit 301 and a sound signal collected by the sound collection unit 302 to the robot 2 as the environmental information.

The environmental sensor 3 and the robot 2 are connected via a wireless or wired network NW.

The number of environmental sensors 3 may be two or more. A position at which the environmental sensor 3 is installed is known and may be stored in advance in the storage unit 207 of the robot 2. Alternatively, the environmental sensor 3 may output installation position information of the environmental sensor 3 to the robot 2 in association with the environmental information.

The acquisition unit 201 receives the environmental information detected by the environmental sensor 3.

The imaging unit 210 is, for example, an imaging device such as a charge-coupled device (CCD) imaging device or a complementary metal oxide semiconductor (CMOS) imaging device attached to the head of the second robot 2 or the like.

The sound collection unit 212 is a microphone and collects the user's sound signal. The sound collection unit 212 may be a microphone array including a plurality of microphones.

For example, the image processing unit 202 extracts an image of a person's face included in the image in a well-known method for the image included in the environmental information detected by the environmental sensor 3 and performs face recognition for the extracted face image in a well-known method. Alternatively, for example, the image processing unit 202 extracts an image of a person's face included in the image in a well-known method for the image captured by the imaging unit 210 and performs face recognition for the extracted face image in a well-known method.

The sound processing unit 203 performs a sound recognition process (for example, a feature quantity extraction process, a noise suppression process, a speech segment estimation process, a sound source direction estimation process, a sound source estimation process, or the like) for the sound signal collected by the sound collection unit 302 or 212 in a well-known method.

The operation processing unit 204 controls an operation of the robot 2 in response to a program stored in the storage unit 207 and, for example, a user's voice instruction, or the like.

The identification unit 205 tries to identify each of a plurality of people located in the vicinity of the robot 2 using at least one of a sound processing result of the sound processing unit 203 and an image processing result of the image processing unit 202.

The score calculation unit 206 recognizes a person (a user or a participant) included in the captured image for each person using a well-known method. The score calculation unit 206 calculates a trust score between people. The score calculation unit 206 calculates a group trust score using the trust score between people.

The policy processing unit 214 performs a process related to the policy using information subjected to image processing and information subjected to the sound recognition process. The privacy policy is a policy of whether or not the robot 2 can store user information, whether or not information can be shared with other robots and the like, or the like. The policy processing unit 214 handles user information on the basis of the privacy policy for each user stored in the storage unit 207.

The storage unit 207 stores programs, threshold values, mathematical formulas, and the like for use in various types of control of the robot 2. The storage unit 207 stores a privacy profile for each user. The storage unit 207 stores a privacy policy for each user.

The sensor 208 is a sensor, an encoder, or the like attached to each part of the robot.

The actuator 209 drives each part of the robot in accordance with the control of the operation processing unit 204.

The robot 2 may include a power-supply unit (not shown), a manipulation unit, an image presentation unit, a speaker, and the like.

<Trust Score>

Next, a trust score will be described.

FIG. 3 is a diagram showing an example of a trust score between two individuals and a group trust score.

In this example, according to the trust score between two individuals H and G, trust levels of H for G in different criteria will be described. The trust score is expressed as an N-tuple $H_G=(t_1, t_2, \ldots, t_N)$, where each value corresponds to a different trust criterion and is between 0.0 and 1.0. For the trust score, information is obtained from many input sources (for example, assignments identified by the user, results of interactions learned by the robot 2 in the past, estimates from similar associations, and the like).

In the example of FIG. 3, for example, three trust criteria are identified as reference examples. The three trust criteria for use are, for example, a social trust level $t_s$, a familial trust level $t_f$, and a professional trust level $t_p$. Also, in FIG. 3, it is expressed as a 3-tuple $H_G=(t_s, t_f, t_p)$, and its value is between 0.0 and 1.0. Also, the score calculation unit 206 ranks from no trust (0.0) to complete trust (1.0). Thus, the trust score is calculated from a plurality of different trust levels (for example, a social trust level, a familial trust level, and a professional trust level). The trust level may be another trust level without being limited to these three and the number of trust levels may be not limited to three and may be two or more. Furthermore, the score calculation unit 206 may obtain a trust score by changing a weight in accordance with the user's environment for each of the plurality of different trust levels.

In FIG. 3, a first row is an item, a second row is a trust score expressed by a 3-tuple of a work colleague of Mr. H, a third row is a trust score expressed by a 3-tuple of a sibling of Mr. H, a fourth row is a trust score expressed by a 3-tuple of a next-door neighbor of Mr. H, and a fifth row is a trust score expressed by a 3-tuple of a stranger unknown to Mr. H.

Here, the robot 2 may recommend a certain individual to the user. In this case, the individual is unknown to the user and the robot 2 may not have a trust score associated with another individual. The information processing system 1 may make a recommendation of trust to the user. For example, the information processing system 1 tries to recommend a teacher or colleague in an academic field that is unknown to the user. Alternatively, the information processing system 1 tries to recommend a bakery store owner who specializes in making custom cakes that the user may need to celebrate a special event. In this case, in the present embodiment, it is treated as an addition score to be used at the time of trust calculation in a calculation process.

<Group Trust Score>

In the following description, it is defined as follows.

H is "an aggregate of all hosts at the time of calculation."

|H| is a host size or the number of hosts in H.

C is "a collection of all contacts of the host."

|C| is "a contact size or the number of contacts in C." Its value is C=H−1.

Thus, when host y is extracted from H and contact x is extracted from C, $y_x$ corresponds to a trust score of y for x. This is an n-tuple with n different trust categories.

Likewise, $x_y$ corresponds to a trust score of x for y and is also an n-tuple with n different categories.

Furthermore, $rec_x$ and $env_{score}$ are n-tuples with the same separate trust categories.

$RMS_y$ corresponds to the "root mean square" of $y_x$. This is a single numerical value. That is, $(RMS_y+1)$ is a scalar multiplied by $y_x$.

Because $(RMS_y+1)*y_x$, $x_y$, and $rec_x$ are all n-tuples, their sum also produces another n-tuple. Next, the score calculation unit 206 calculates an entrywise product between $env_{score}$ and the generated sum to generate another n-tuple.

This process is iterated for all possible combinations of the host and contacts. Also, all of these results add up.

The final result is yet another n-tuple.

Also, finally, this n-tuple is scalar-multiplied by numerical values (1/|H|) and (1/|C|). This final value is a group trust score when a particular host does not exist.

Therefore, the process is simplified in consideration of calculation in the presence of a dedicated host. Many of the same principles apply, but the summation is only done over the results for all contacts of the dedicated host. Another exception is that the final sum has a scalar multiple of (1/|C|) instead of what was done before.

<Environment Detection>

The robot 2 can also use additional context about its environment to decide more information about a type of gathering that is likely to occur between individuals while in the space with the robot 2. The environment detection can be performed in place. For example, if the environment detection is set up at home, office, school, public space, or the like, it can be fixed at the initial setup of the robot 2.

According to the environmental sensing score (environmental sensing score), what the robot 2 recognizes or believes about a type of gathering on three different axes of a social gathering, a familial gathering, and a professional gathering is described. For example, the robot 2 installed in the company's office understands that the gathering and interaction between users and participants in place is also work-related. In this example, the robot 2 can assume that a trust relationship between individuals in place is most commonly of a professional nature.

FIG. 4 is a diagram showing an example of a gathering setting, an involved gathering type, and an example of an environmental score. In FIG. 4, a first column is the gathering setting, a second column is the gathering type, and a third column is the environmental score. A first row is an item, a second row is a gathering in a company, a third row is a gathering at school, a fourth row is a gathering at home, and a fifth row is a gathering in a public place. The gathering in the company is a gathering type of Professional and has an environmental score of (0.0, 0.0, 1.0). The gathering at school is a gathering type of Professional or Social and has an environmental score of (0.5, 0.0, 0.7). The gathering at home is a gathering type of Family or Social and has an environmental score of (0.7, 0.7, 0.0). The gathering at a public place is a gathering type of Social and has an environmental score of (1.0, 0.0, 0.0). Thus, an environmental score $env_{score}$ includes a 3-tuple (social trust level $t_s$, familial trust level $t_f$, professional trust level $t_p$) decided on the basis of environmental information.

In the calculation, for the environmental score, for example, weighting is applied during the calculation of the group trust score.

<Privacy Profile>

Here, a privacy profile will be described. The privacy profile is information about a user.

FIG. 5 is a diagram showing an example of a privacy profile stored in the storage unit. As shown in FIG. 5, the storage unit 207 stores the privacy profile in association with the user's identification information (user ID). The privacy profile is, for example, information of a usage location of the robot 2 (for example, latitude and longitude, address, building name, company name, and the like), the user's age, profession, gender, hobbies, and the like. The privacy profile may include the user's speech content (a voice signal, a voice feature quantity, text data of the speech content, and the like), the user's face photo information, and the like.

The privacy profile described with reference to FIG. 5 is an example and may include other information, information may be added, information may be deleted, or information may be updated. For example, the policy processing unit 214 processes this information.

<Example of Process>

Figure 6:
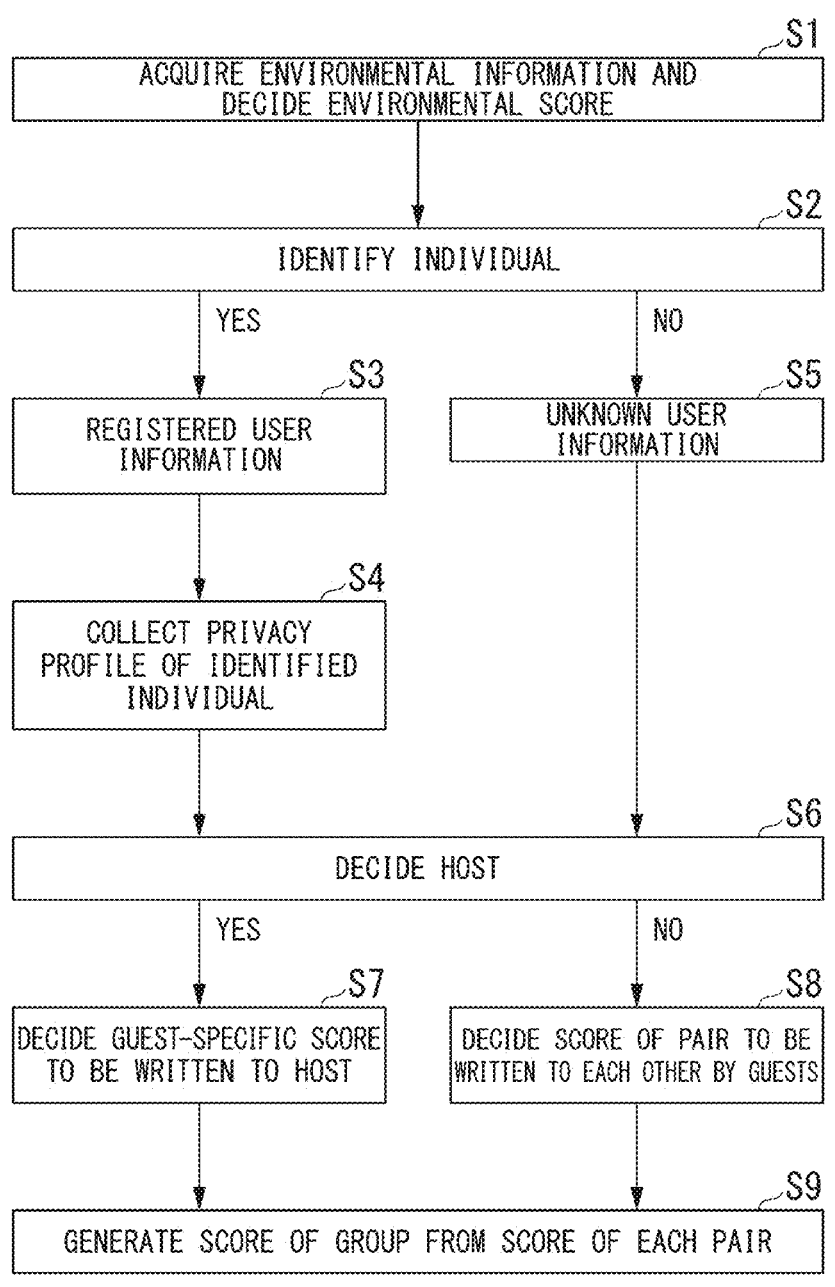
FIG. 6 is a flowchart showing an example of a processing procedure for obtaining a group trust score according to the embodiment.

In the present embodiment, for the general physical setup, it is assumed that the robot 2 is arranged in a common space in which a human individual can be identified. The robot 2 may be stationary or movable to perform this task (recognize and identify an individual). FIG. 6 is a flowchart showing an example of a processing procedure for obtaining a group trust score according to the present embodiment. In the following process, it is assumed that there are two or more people around the robot 2, and, for example, a conversation (activity) is taking place.

(Step S1) The environmental sensor 3 detects, for example, environmental information of an environment around the robot 2. The acquisition unit 201 acquires environmental information from the environmental sensor 3. The score calculation unit 206 estimates an environment in which a plurality of users and the robot 2 are located on the basis of, for example, an image, position information, and the like included in the acquired environmental information, and decides an environmental score $env_{score}$, for example, as shown in FIG. 3 on the basis of an estimation result. The environmental score may be determined in advance for each environment and stored in the storage unit 207.

(Step S2) The identification unit 205 tries to identify an individual participating in the activity at the beginning or during the activity of the person using the environmental information. When identification is possible (step S2; YES), the identification unit 205 proceeds to the processing of step S3. When identification is not possible (step S2; NO), the identification unit 205 proceeds to the processing of step S5. In the case of an individual who is not registered in the storage unit 207, the identification unit 205 determines that the individual is a stranger (unknown person) to the information processing system 1.

(Step S3) The identification unit 205 determines that identification is possible when the individual who can be identified is registered in the storage unit 207. After processing, the identification unit 205 proceeds to the processing of step S4.

(Step S4) The score calculation unit 206 retrieves the privacy profile of each identified individual from the storage unit 207. After processing, the score calculation unit 206 proceeds to the processing of step S6.

In step S5, the score calculation unit 206 considers a person who cannot be recognized as an unknown user. After processing, the score calculation unit 206 proceeds to the processing of step S6.

(Step S6) The score calculation unit 206 decides a specific individual as a host in the group on the basis of the privacy profile. The individual can be designated according to whether he or she is an active speaker, or an activity leader, among other possibilities.

(Step S6) When the host can be decided (step S5; YES), the score calculation unit 206 decides the pairwise scoring of trust from another participant in the group to the host. That is, the score calculation unit 206 calculates a trust score for each pair with respect to other participants for the host. As described above, the trust score embodies a trust level within a group for each of the three trust types (social trust, familial trust, and professional trust). After processing, the score calculation unit 206 proceeds to the processing of step S8.

(Step S7) The score calculation unit 206 decides the pairwise scoring of the participants of the group for each other when the host cannot be decided (step S5; NO). That is, the score calculation unit 206 decides pair-specific scoring between pairs of individuals in all permutations. After processing, the score calculation unit 206 proceeds to the processing of step S8.

(Step S8) The score calculation unit 206 generates a group trust score from all pairwise scores.

Subsequently, this result is used for the behavior of the robot 2 taking into account the group dynamics and the trust relationship within the group.

The above-described processing procedure and processing content are examples and the present invention is not limited thereto. For example, some processing steps may be performed in parallel.

<Calculation of Group Trust Score>

Next, an example of a method of calculating the group trust score will be described.

When the host can be decided, the score calculation unit 206 calculates a group trust score GroupTrust$_H$ using the following Eq. (1).

$$GroupTrust_H = \frac{1}{|C|}\sum_{x \in C} env_{score} \odot (H_x \cdot (RMS_H + 1) + x_H + rec_x) \quad (1)$$

In Eq. (1), H denotes a set of all temporary hosts. C denotes a collection of all other individuals in the group. $H_x$ denotes a trust score of H for contact (a contact partner or another user) x. $RMS_H$ denotes the root mean square calculation of $H_x$. $rec_x$ denotes a recommendation trust score of individual x. $env_{score}$ denotes an environmental score. $x_H$ denotes a trust score of x for H. The recommendation trust score includes a 3-tuple (social trust level $t_s$, familial trust level $t_f$, professional trust level $t_p$) like the trust score described above. In other words, the recommendation trust score is a trust score for the individual recommended by the robot 2. The score calculation unit 206 calculates or decides a recommendation trust score that is a lookup value decided from an individual's user profile.

The group trust score identified by this host is calculated for each of various criteria. This group trust score indicates the trust associated with each criterion for this group of hosts. A higher score indicates a higher trust level when this host is in engaging with a particular criterion. A lower score indicates a lower trust level for this host.

When the host cannot be decided, the score calculation unit 206 calculates the group trust score Group Trust using the following Eq. (2).

$$GroupTrust = \quad (2)$$

$$\frac{1}{|C|} \cdot \frac{1}{|H|} \sum_{y \in H} \sum_{x \in C} env_{score} \odot (y_x \cdot (RMS_y + 1) + x_y + rec_x)$$

In Eq. (2), $y_x$ denotes a trust score of y for contact x. $RMS_y$ denotes the root mean square of $y_x$. $x_y$ denotes a trust score of x for y.

For this general group trust score, a value is created for each of various criteria. According to this, the feeling of trust associated with each criterion among all members of the group is described. A higher score indicates a higher level of trust in engaging with a particular criterion. A lower score indicates a lower level of trust in engaging with a particular criterion.

<Privacy Policy>

Figures 7, 8:
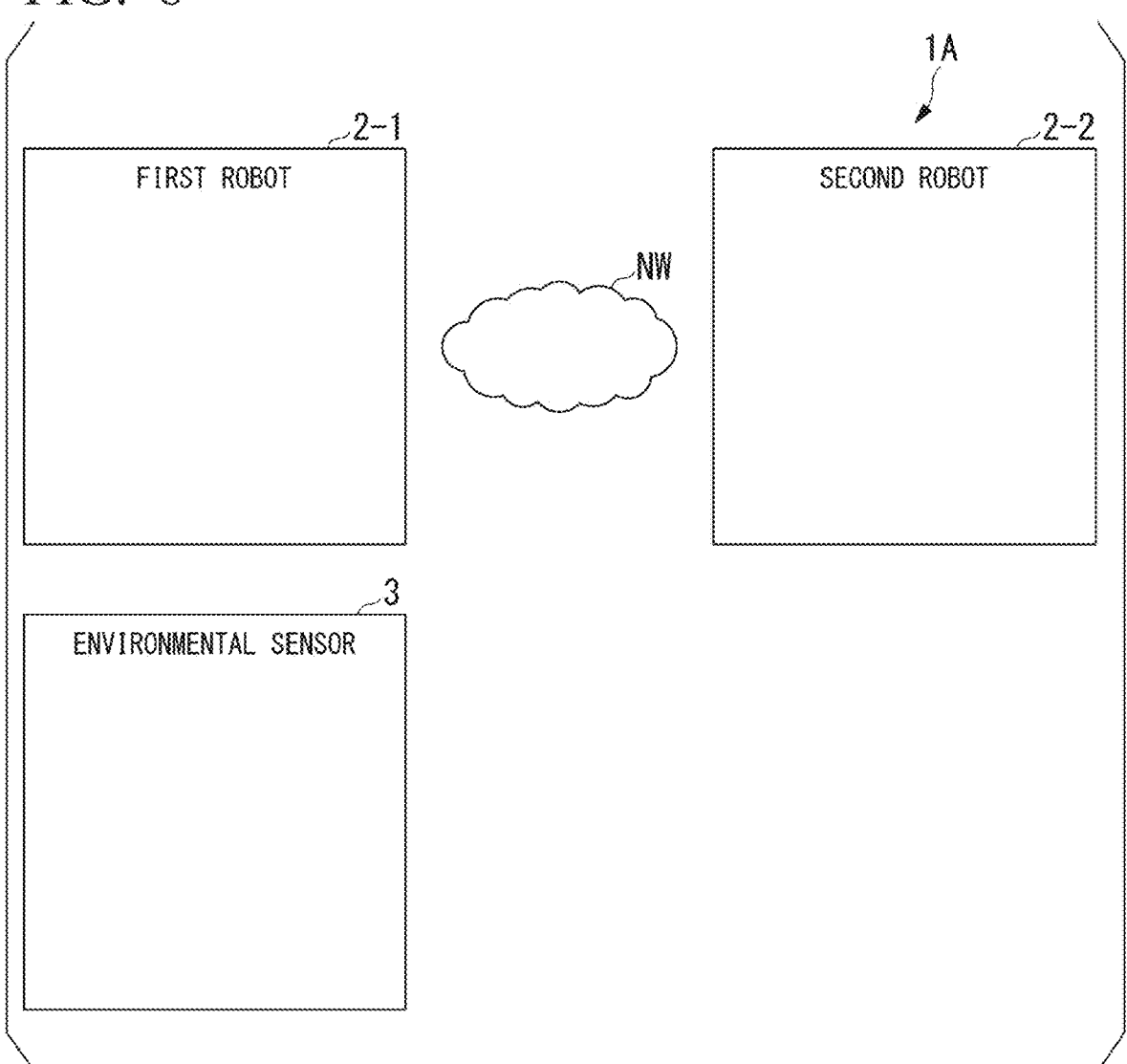
FIG. 7 is a diagram showing an example of a privacy policy stored in the storage unit.
FIG. 8 is a diagram showing an example of a configuration of an information processing system including a plurality of robots according to the embodiment.

FIG. 7 is a diagram showing an example of a privacy policy stored in the storage unit. As shown in FIG. 7, the storage unit 207 stores privacy policy information in association with the user's identification information (user ID). The privacy policy information includes, for example, information such as whether to allow or disallow sharing, whether to allow or disallow holding, and whether to allow or disallow learning. For example, image information (a face image, a feature quantity of an image, or the like) and sound information (a sound feature quantity or the like) may be associated with the user ID.

<Information Processing System Including Plurality of Robots>

FIG. 8 is a diagram showing an example of a configuration of an information processing system including a plurality of robots according to the present embodiment. Although a case where there are two robots is shown in the example of FIG. 8, the number of robots may be three or more.

The information processing system 1A includes, for example, a first robot 2-1, a second robot 2-2, and an environmental sensor 3.

The configurations of the first robot 2-1 and the second robot 2-2 are similar to the configuration of the robot 2 of the information processing system 1. For this reason, the first robot 2-1 includes, for example, an acquisition unit 201-1, an image processing unit 202-1, a sound processing unit 203-1, an operation processing unit 204-1, an identification unit 205-1, a score calculation unit 206-1, a storage unit 207-1, a sensor 208-1, an actuator 209-1, a policy processing unit 214-1, an imaging unit 210-1, and a sound collection unit 212-1. The second robot 2-2 includes, for example, an acquisition unit 201-2, an image processing unit 202-2, a sound processing unit 203-2, an operation processing unit 204-2, an identification unit 205-2, a score calculation unit 206-2, a storage unit 207-2, a sensor 208-2, an actuator 209-2, a policy processing unit 214-2, an imaging unit 210-2, and a sound collection unit 212-2. The configurations of the first robot 2-1 and the second robot 2-2 may be the same or different.

The first robot 2-1 is used by the first user and is installed, for example, at the home of the first user.

The second robot 2-2 is used by the second user and is installed, for example, at the home of the second user.

<Policy Processing>

Figure 9:
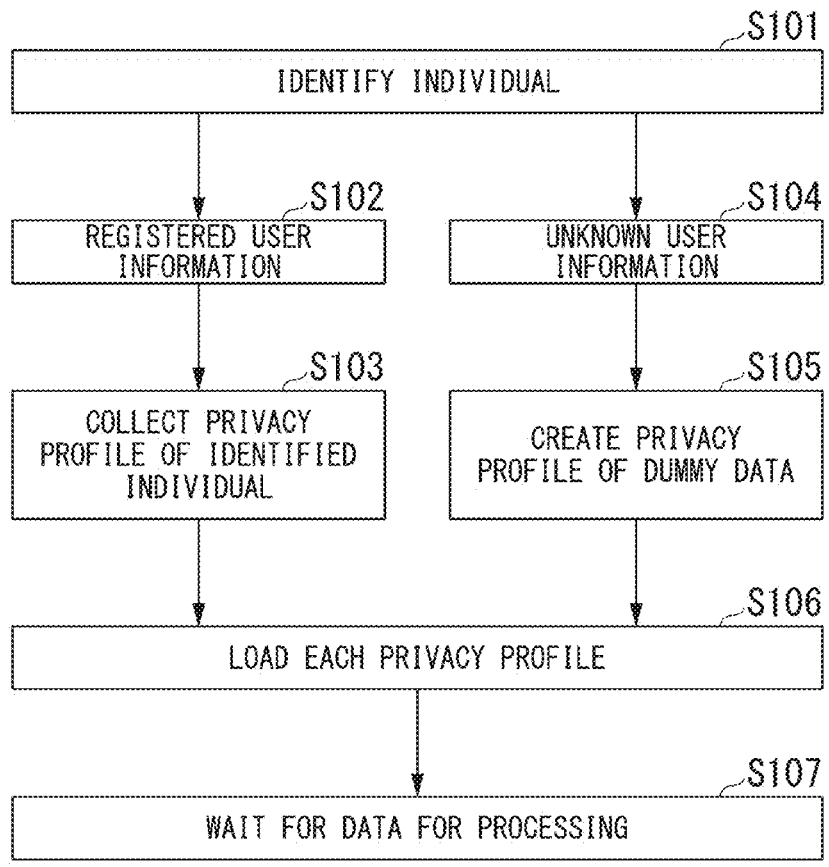
FIG. 9 is a diagram showing an example of a procedure for acquiring a privacy policy according to the embodiment.

Next, a process to be performed by the policy processing unit will be described. FIG. 9 is a diagram showing an example of a procedure for acquiring a privacy policy according to the present embodiment. The following process is performed, for example, when the second robot 2-2 starts the interaction with the user.

(Step S101) The policy processing unit identifies a person in a given place on the basis of, for example, an image captured by at least one of the imaging units 301, 210-1, and 210-2 and/or a sound collected by at least one of the sound collection units 302, 212-1, and 212-2. When there are a plurality of people in the given place, the policy processing unit 214-2 recognizes each person.

(Step S102) The policy processing unit 214-2 identifies a recognized person when the person is already recognized and stored in the storage unit 207-2. Identification information of the person may be stored in a server or the like via the network NW.

(Step S103) The policy processing unit 214-2 allows the collection and storage of a privacy profile, which is recognized personal user information, and causes the storage unit 307 to store the collected personal information in association with identification information. User information includes, for example, a name, a usage location, an age, a gender, an occupation a place of residence, hobbies, speech content, and the like. After the end of step S103, the policy processing unit 214-2 proceeds to the processing of step S106.

(Step S104) The policy processing unit 214-2 determines that the person is unknown to a robot when the person is not already recognized and stored in the storage unit 207-2 or when the individual cannot be identified.

(Step S105) The policy processing unit 214-2 creates the dummy privacy profile described above. After the end of step S105, the policy processing unit 214-2 proceeds to the processing of step S106.

(Step S106) The policy processing unit 214-2 loads the privacy profile of step S103 or S105.

(Step S107) The policy processing unit 214-2 waits for data for processing.

According to the above-described process, the robot can recognize an allowable level of appropriate processing to be performed by its device and what to do (or what not to do) with personal user data.

<Personal Privacy Profile>

First, the handling of the privacy profile of the present embodiment, policy, and the like will be described.

Figure 10:
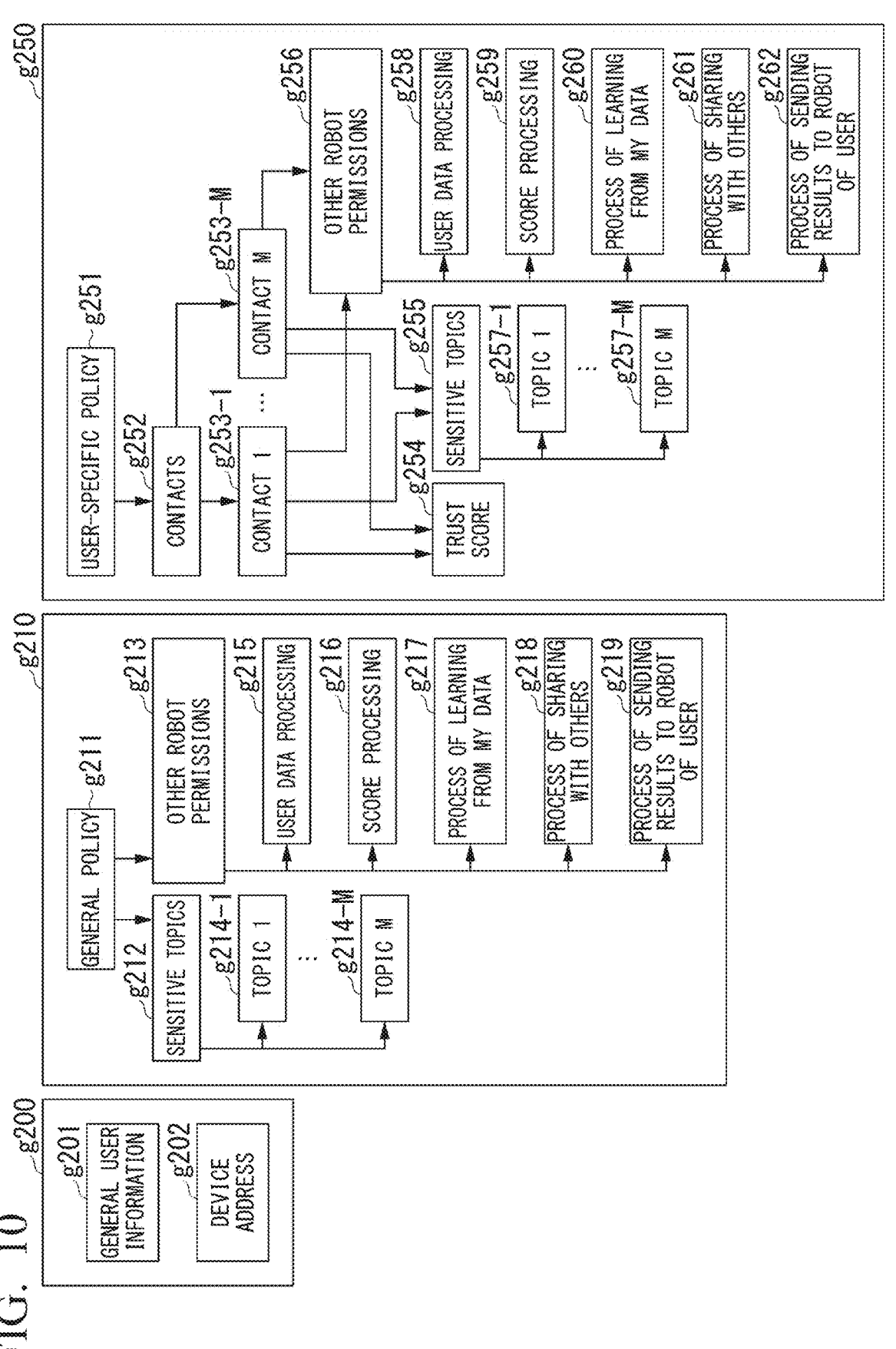
FIG. 10 shows an example of a user's privacy policy.

FIG. 10 is a diagram showing an example of a user privacy policy (user public privacy policy).

In a square (third information area) of reference sign g200, for example, general user information g201 (public accessible user information) and a device address g202 are provided.

The information in this area is information about an individual considered appropriate to be shared with other robots. This information includes, for example, information about the user (general user information) such as a name of the user and a user ID (identification information) within a robot system. This information also includes, for example, a device address that can be used by other robots to potentially send data.

A square (first information area) of reference sign g210 includes, for example, a general policy g211, sensitive topics g212, and other robot permissions g213 (other device permissions).

The sensitive topics g212 include M topics (where M is an integer of 2 or more) from topic 1 (g214-1) to topic M (g214-M). Each topic includes an estimated sensitivity score (Sensitivity Est. Score).

A block of the other robot permissions (g213) is a generalized permission block that is considered to be the default policy regarding how other robots use this personal data. This block includes a series of permission policies that decide a level of data processing capable of being performed by other robots for the user.

The other robot permissions (g213) include, for example, the following content.

a) User data processing (Can Process my data) (g215); whether or not another robot (second robot) can process this user information (Yes or No).

b) Score processing (Can Store) (g126): whether or not another robot (second robot) can store user information within the memory of the second robot (Yes or No).

c) Process of learning from my data (Can Learn from my data (anon)) (g217): whether another device (second robot) can learn from this user information (unrestrictedly possible, anonymously possible, or impossible).

d) Process of sharing with others (Can Share with others) (g218): whether or not another robot (second robot) can share this user information with the user's first robot (Yes or No).

e) Process of sending results to the robot of the user (Can send results to my device) (g219); whether another robot (second robot) can send this user information back to the user's first robot (send all of the results and raw data, send only the results after processing, send only the raw data before processing, or send nothing).

The policy, processing, and determination described above are examples and the present invention is not limited thereto.

The purpose of sensitive topics (g212) is, for example, to provide a notification of sensitivity when a specific topic is discussed by another robot (a second robot). This policy includes, for example, whether or not it is an appropriate topic to discuss medical information such as allergies and the like.

The score for each topic provides granularity in deciding permission to discuss the topic.

In the square of reference sign g250 (second information area), a user-specific policy g215, contacts g252, M contacts from contact 1 (g253-1) to contact M (g253-M), a trust score g254, sensitive topics g255, and other robot permissions (other device permissions) g256 are provided.

The sensitive topics g255 include M topics (where M is an integer of 2 or more) from topic 1 (g257-1) to topic M (g257-M). Each topic includes an estimated sensitivity score (Sensitivity Est. Score).

Examples of configurations and processing of the other robot permissions g256 will be described below.

Thus, the present embodiment can include a user-specific policy for customizing preferences when the user interacts with other specific individuals or their devices.

As indicated by reference sign g250, there is a permission block designated on the basis of Contact indicating a contact destination identified by the user. Under this permission block, there is a possibility that a permission block will be present when the user interacts with a robot belonging to one of contacts designated by this user.

A trust score g254 is a group trust score and a user information handling level is changed on the basis of this group trust score. As will be described below with reference to FIGS. 11 to 13, user information handling levels (processing levels) are, for example, a partial level (PARTIAL) and a full level (FULL), and indicate the allowance of the use of all of the user information, the allowance of the use of a part of the user information, the disallowance of handling of all of the user information, and the like. The handling level is not limited to this.

Furthermore, in addition to the permission block and the sensitive topic block, as indicated by reference sign g250, the user can provide some additional information about his or her contact, such as a trust score and other metadata. The structures, processing, and determinations of the other robot permissions (g256) are similar to those of the other robot permissions (g213).

In the structure of the privacy profile of the present embodiment, flexibility and extensibility are enabled so that entries can be added, modified, and deleted with the elapse of time in accordance with personal preferences and continuous interaction with the robot.

<Default Privacy Profile and Dummy Privacy Profile>

Next, a default privacy profile and a dummy privacy profile will be described.

First, when the user sets up the robot, a "default privacy profile" including, for example, the user's name, user ID, and device ID in the user information block, is created. Within the general permission block, all individual policies are set to "NO" (not allowed) until the robot learns the user's preferences for each policy.

Likewise, the sensitive topic block is also left empty until the robot learns the user's specific topic and how to assess the sensitivity of the topic. Also, the robot leaves a specific permission block empty until the user designates trusted contact.

The concept of a default privacy profile is further abstracted and there is also the idea of a "dummy privacy profile" that can be used to represent a stranger to a robotic system. In the present embodiment, the concept of the "dummy privacy profile" is also used.

The purpose of this "dummy privacy profile" is to represent how robots should handle and process user data of an individual that is unknown to robots and robot systems. The content of the "dummy privacy profile" is the same as that of the default privacy profile, with the exception that there is no device ID associated with this individual (a username field is also left blank). Thus, the unique content of the "dummy privacy profile" is a general authority block in which a uniquely generated user ID and all individual policies are set to "NO."

<Data Processing Method and Data Processing Procedure>

Next, an example of a data processing method and an example of a data processing procedure will be described.

In the workflow for interaction data for each user, for example, "appropriate processing" to be executed by the second robot 2-2 and information to be sent to the user's first robot 2-1 are described. Also, there are, for example, up to five checks that are likely to be executed for user information. This corresponds to the device authority of the user's privacy profile. In the following description, it is assumed that the robot for performing determination and processing is the second robot 2-2 and the robot for exchanging information is the first robot 2-1.

(First Process)

Figure 11:
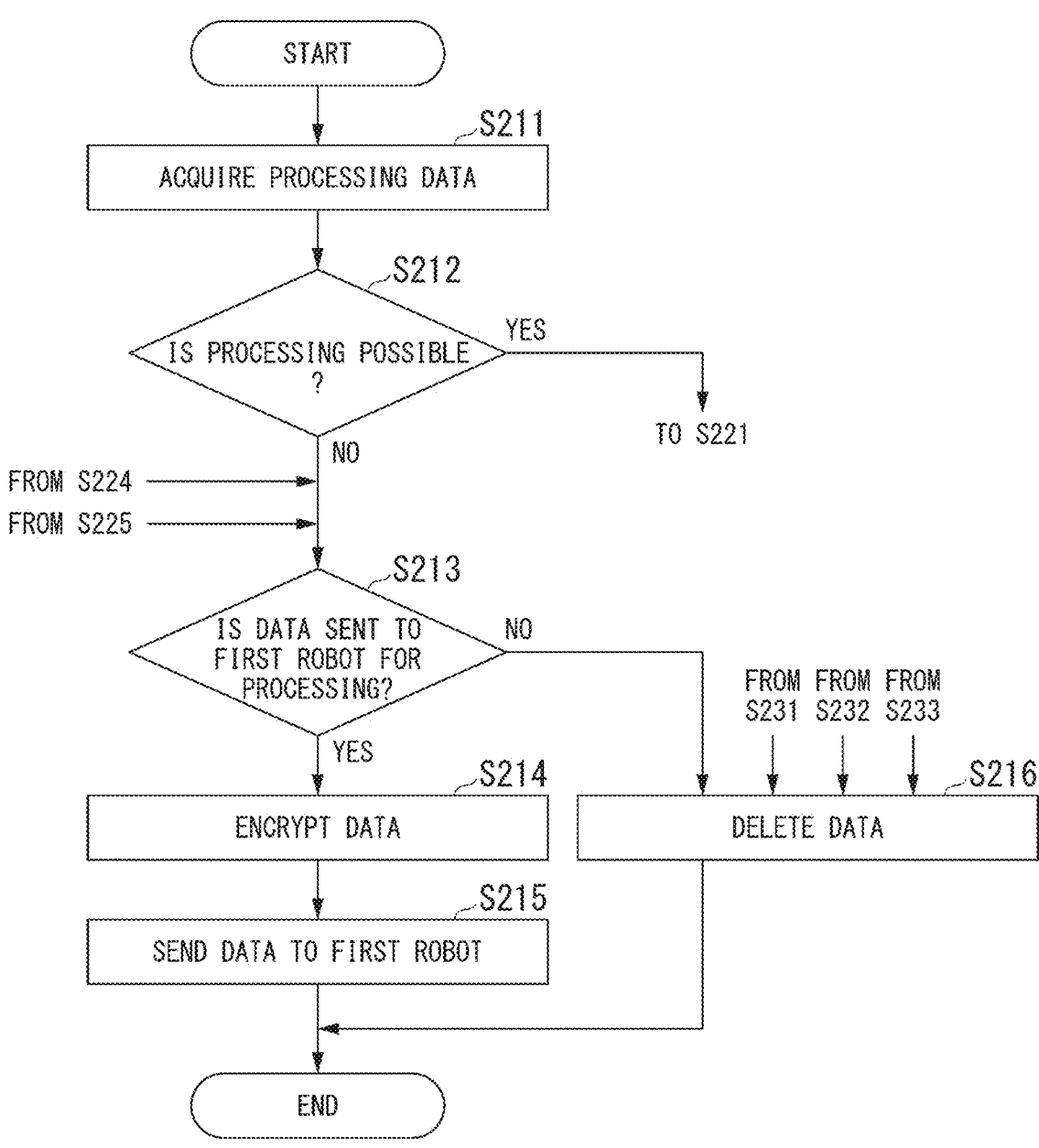
FIG. 11 is a flowchart of a first process in the embodiment.

FIG. 11 is a flowchart of a first process in the present embodiment. The first process is a process when the data processing check fails.

(Step S211) The policy processing unit 214-2 acquires processing data. The processing data is, for example, information based on a captured user image and speech content of a collected sound.

Figure 12:
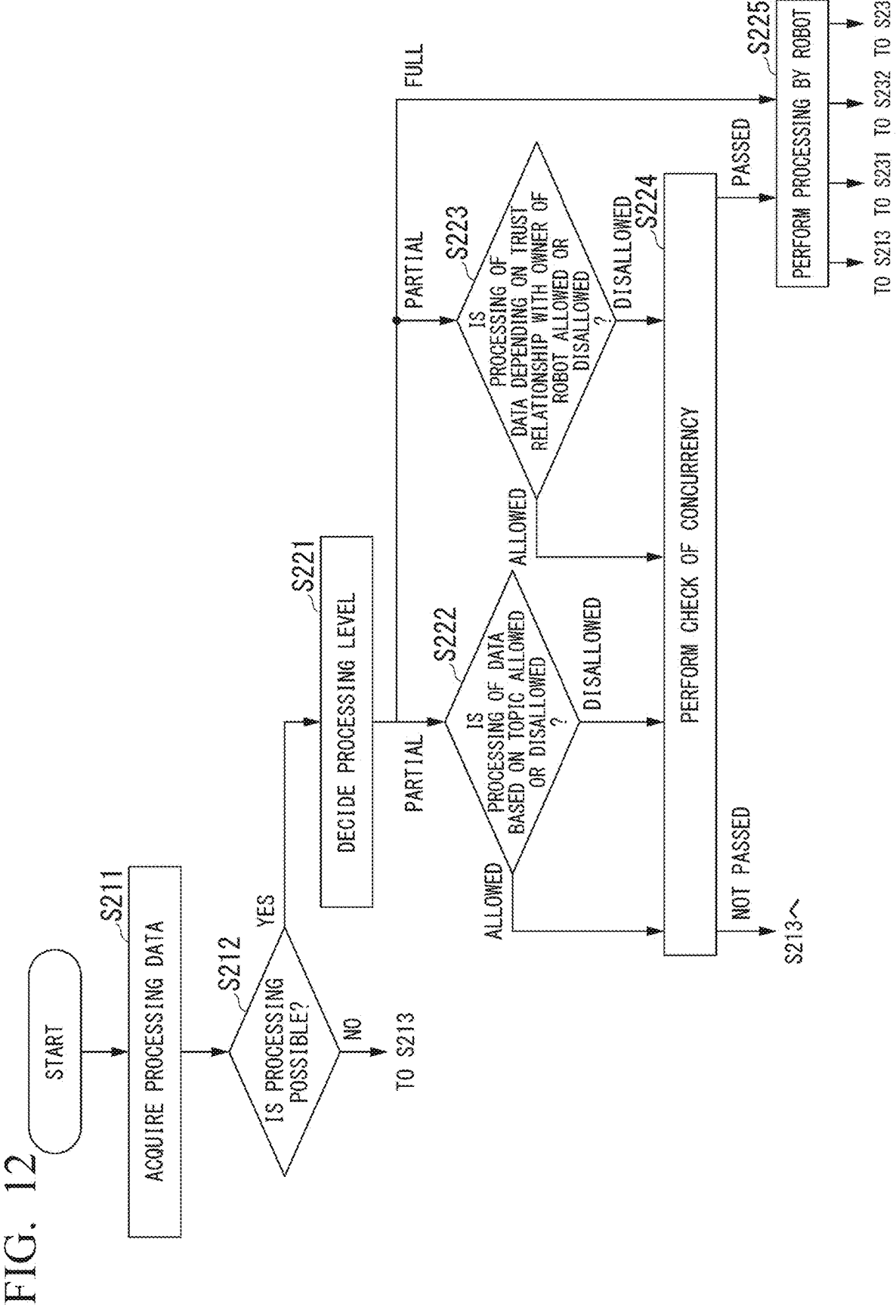
FIG. 12 is a flowchart of the first process in the embodiment.

(Step S212) The policy processing unit 214-2 checks whether or not the second robot 2-2 can process (is allowed to process) the processing data. When the second robot 2-2 can process the processing data (step S212; YES), the policy processing unit 214-2 proceeds to the processing of step S221 (FIG. 12). When the second robot 2-2 cannot process the processing data (step S212; NO), the policy processing unit 214-2 proceeds to the processing of step S213.

(Step S213) The policy processing unit 214-2 checks whether or not the processing data is to be sent to the user's first robot 2-1 for processing. When the policy processing unit 214-2 should send the processing data to the user's first robot 2-1 for processing (step S213; YES), the process proceeds to the processing of step S214. When the policy processing unit 214-2 should not send the processing data to the user's first robot 2-1 for processing (step S213; NO), the process proceeds to the processing of step S216.

(Step S214) The policy processing unit 214-2 encrypts the processing data. After processing, the policy processing unit 214-2 proceeds to the processing of step S215.

(Step S215) The policy processing unit 214-2 transmits the encrypted processing data to the user's first robot 2-1 using, for example, the user's device ID. After processing, the policy processing unit 214-2 ends the process.

(Step S216) The policy processing unit 214-2 deletes the processing data without storing the processing data. After processing, the policy processing unit 214-2 ends the process.

(Second Process)

FIG. 12 is a flowchart of a second process in the present embodiment. The second process is a process when the data processing check is successful.

(Step S212) The policy processing unit 214-2 proceeds to the processing of step S221 when the second robot 2-2 can process processing data (step S212; YES).

(Step S221) The policy processing unit 214-2 decides a processing level. Processing levels are, for example, a partial level (PARTIAL) and a full level (FULL). When the processing level is the partial level (PARTIAL), the policy processing unit 214-2 proceeds to the processing of steps S222 and S223. When the processing level is the full level (FULL), the policy processing unit 214-2 proceeds to the processing of step S225.

(Step S222) The policy processing unit 214-2 compares a user's sensitive topics list stored in the storage unit 207-2 with a topic or keyword to check metadata of the processing data. The policy processing unit 214-2 decides whether or not to allow data processing on the basis of a check result. When the policy processing unit 214-2 allows the data processing (step S222; ALLOWED), the process proceeds to the processing of step S224. When the policy processing unit 214-2 does not allow the data processing (step S222; DISALLOWED), the process proceeds to the processing of step S224.

(Step S223) The policy processing unit 214-2 performs comparison with an identified user for the processing in the user's first robot 2-1 and refers to a unique profile of the user stored in the storage unit 207-2. Furthermore, the policy processing unit 214-2 determines whether or not this processing is data processing that depends on a relationship of trust between the owner of the second robot 2-2 and the user. The policy processing unit 214-2 determines whether or not to allow data processing according to a determination result. When the data processing is allowed (step S223; ALLOWED), the policy processing unit 214-2 proceeds to the processing of step S224. When the data processing is not allowed (step S223; DISALLOWED), the policy processing unit 214-2 proceeds to the processing of step S224.

(Step S224) The policy processing unit 214-2 checks concurrency on the basis of trust between the topic and another individual. When a result of the check is successful (step S224; passed), the policy processing unit 214-2 proceeds to the processing of step S225. When a result of the check is not successful (step S224; not passed), the policy processing unit 214-2 proceeds to the processing of step S213 (FIG. 11).

(Step S225) The policy processing unit 214-2 proceeds to the respective processing steps (steps S213 and S231 (FIG. 13), S232 (FIG. 13), and S233 (FIG. 13)) to process the processing data in the second robot 2-2.

(Third Process)

Figure 13:
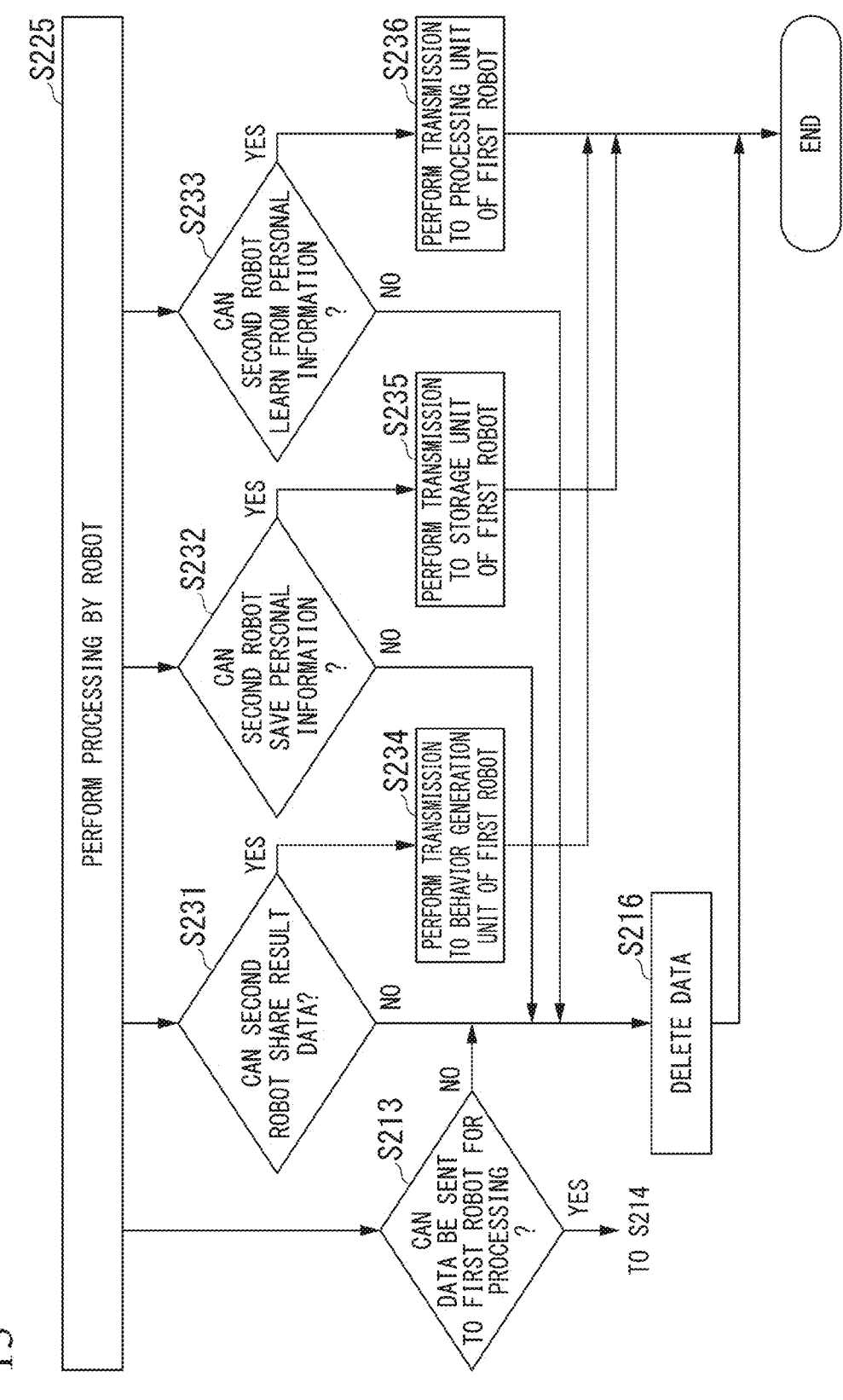
FIG. 13 is a flowchart of the first process in the embodiment.

FIG. 13 is a flowchart of a third process in the present embodiment. The third process is a process on the second robot 2-2.

(Step S225) The policy processing unit 214-2 proceeds to the respective processing steps (steps S216, S231, S232, and S233) to process the processing data in the second robot 2-2. The policy processing unit 214-2 performs the processing of step S213 to determine whether or not the result can be sent to the first robot 2-1, which is the host device.

(Step S231) In order to provide a notification of the operation of the second robot 2-2, the policy processing unit 214-2 checks whether or not a processing result can be shared with the first robot 2-1. When the processing result can be shared (step S231; YES), the policy processing unit 214-2 proceeds to the processing of step S234. When the processing result cannot be shared (step S231; NO), the policy processing unit 214-2 proceeds to the processing of step S216.

(Step S232) The policy processing unit 214-2 checks whether or not the processing result can be saved in the storage unit 207-2 of the second robot 2-2. When the processing result can be saved in the storage unit 207-2 of the second robot 2-2 (step S232; YES), the policy processing unit 214-2 proceeds to the processing of step S235. When the processing result cannot be saved in the storage unit 207-2 of the second robot 2-2 (step S232; NO), the policy processing unit 214-2 proceeds to the processing of step S216.

(Step S233) The policy processing unit 214-2 checks whether or not the second robot 2-2 can learn from the data and results anonymously. When the second robot 2-2 can learn from the data and results anonymously (step S233; YES), the policy processing unit 214-2 proceeds to the processing of step S236. When the second robot 2-2 cannot learn from the data and results anonymously (step S233; NO), the policy processing unit 214-2 proceeds to the processing of step S216.

(Step S216) When check results in steps S231, S232, and S233 are NO, the policy processing unit 214-2 deletes the results and data. After processing, the policy processing unit 214-2 ends the process.

(Step S234) The policy processing unit 214-2 sends data and results to the operation processing unit 204-1 of the first robot 2 (Host's Device Behavior). After processing, the policy processing unit 214-2 ends the process.

(Step S235) The policy processing unit 214-2 sends the data and results to the first robot 2-1 so that they are stored in the storage unit 207-1 of the first robot 2-1 (Host's Device Storage).

(Step S236) The policy processing unit 214-2 sends data and results to the operation processing unit 204-1 of the first robot 2-1 (Host's Device Logic). After processing, the policy processing unit 214-2 ends the process.

The processing procedure and processing content shown in FIGS. 11 to 13 are examples and the present invention is not limited thereto. For example, some processing steps may be performed at the same time.

Although an example in which the user's robot is the first robot 2-1 and the second robot 2-2 performs the processing related to the policy has been described in the above-described example, the robot of the user may be the second robot 2-2 and the first robot 2-1 may perform a process related to a policy.

<Evaluation>

(First Evaluation)

In a first evaluation, the evaluation was performed using semi-random datasets. The dataset was created to test the rigor of the calculation. This dataset was randomly generated with the following constraints:

G denotes the total number of unique participants. The maximum number or final number of contacts capable of being taken by a member of J=G is randomly selected. Contact selection is randomly performed.

Trust scores were randomly decided in accordance with the following criteria.

$t_1$ is a random number between 0.5 and 0.9.

$t_2$ is a random number between 0.1 and $t_1$.

$t_3 = 1 - t_1 - t_2$

These three values were randomly placed in a 3-tuple of trust scores $(t_s, t_f, t_p)$. A range of value randomization took into account a situation where one of the trust scores is superior to the other two and a secondary trust score is likely to be below an average.

Figure 14:
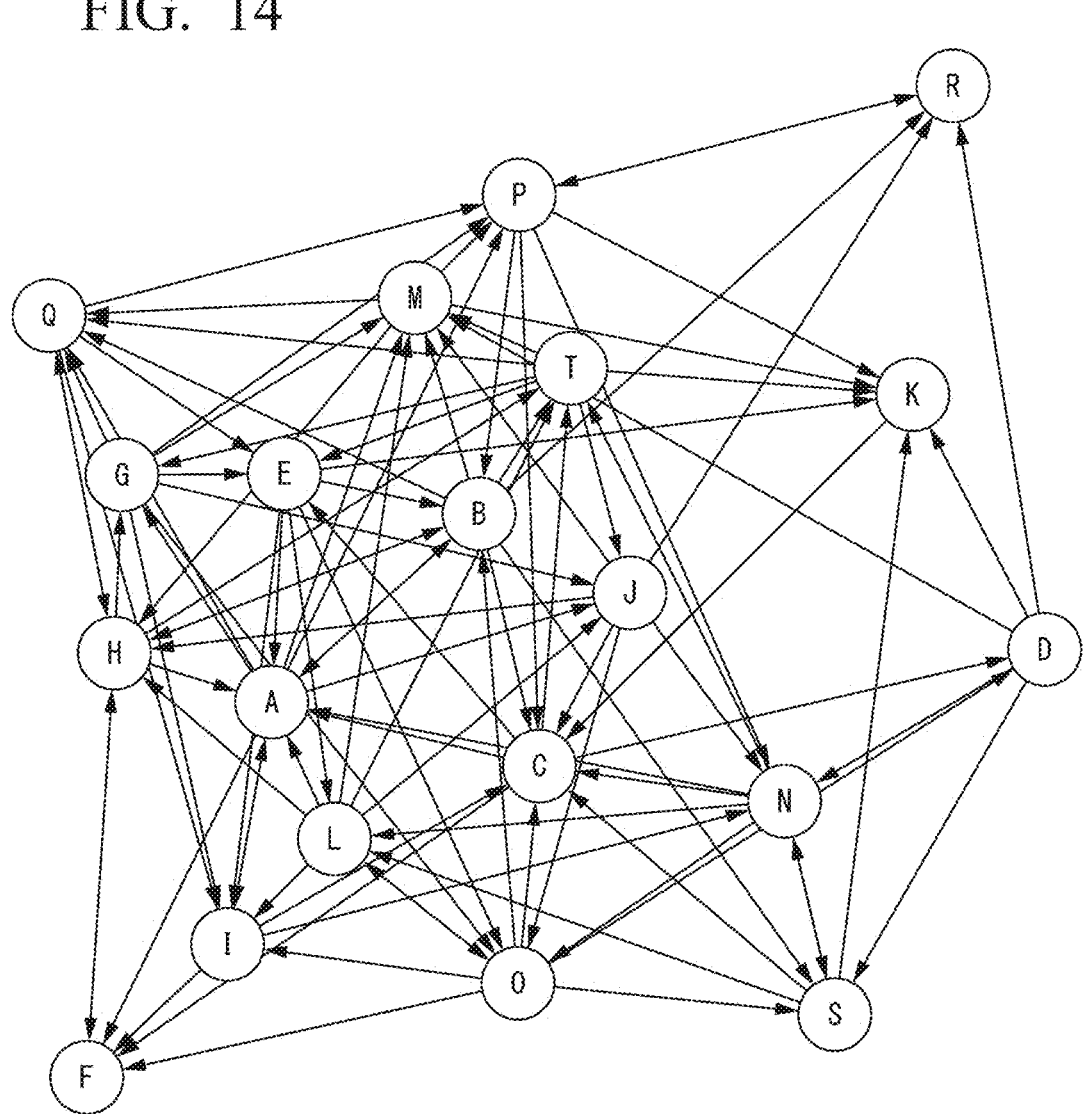
FIG. 14 is a diagram showing an example of a network of a total of 109 connections and datasets when G=20 and J=8.

FIG. 14 is a diagram showing an example of a network of a total of 109 connections and datasets when G=20 and J=8. This directed graph shows whether or not there is a trust score from one individual to another. That is, a relationship connected by an arrow indicates that there is a relationship of trust.

Figure 15:
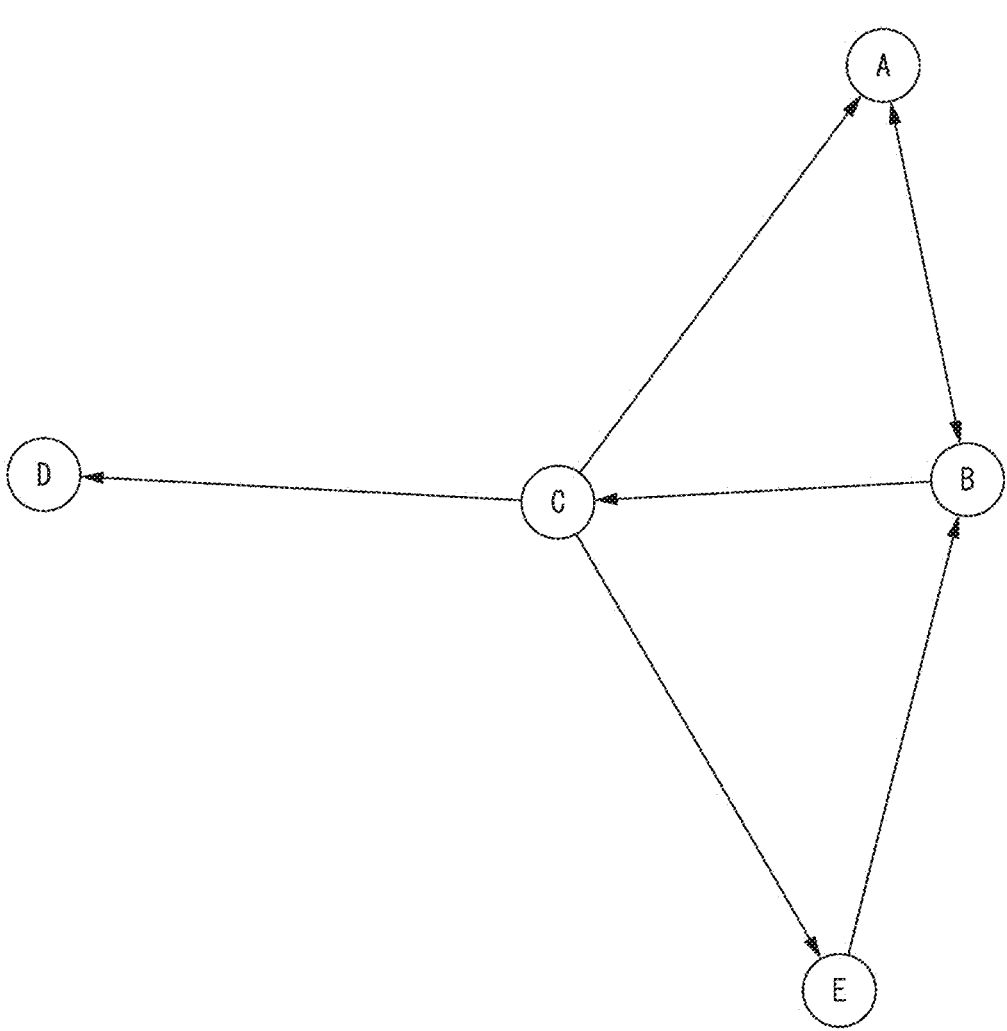
FIG. 15 is a diagram showing a simple subgroup showing trust relationships between users A, B, C, D, and E.

FIG. 15 is a diagram showing a simple subgroup indicating trust relationships between users A, B, C, D, and E. FIG. 15 is also an example in which a subgroup is selected from the large network of FIG. 14. In the following scenario, individuals A, B, C, D, and E are interacting with the robot 2 and the robot 2 is trying to ascertain a group trust score.

In this subgroup, trust scores were generated as shown in FIG. 16. FIG. 16 is a diagram showing an example of a group trust score based on FIG. 15. In FIG. 16, a first row is an item, a second row is a case where A is a host, third and fourth rows are a case where B is a host, fifth to seventh rows are a case where C is a host, and an eighth row is a case where E is a host. A third column is social trust, a fourth column is familial trust, a fifth column is professional trust, and a sixth column is an average value of the third to fifth columns.

The score calculation unit 206 selects a dominant trust score (for example, a predetermined value (for example, 0.5) or more). In FIG. 16, the selected dominant score is highlighted as indicated by reference sign g101.

Using the algorithm of the present embodiment, the group trust score is shown in FIG. 17. FIG. 17 is a diagram showing an example of a group trust score based on FIG. 16.

In FIG. 17, a first row is an item, a second row is a case where A is a host, a third row is a case where B is a host, a fourth row is a case where C is a host, a fifth row is a case where D is a host, a sixth row is a case where E is a host, and a seventh row is a general case. A second column is social trust, a third row is familial trust, and a fourth row is professional trust.

In FIG. 17, a dominant group trust score is highlighted as indicated by reference sign g11 and a second dominant score is highlighted as indicated by reference sign g112.

In the above-described calculation, env$_{ScoreValue}$ was (1.0, 1.0, 1.0) and the recommendation trust score value was (0.0, 0.0, 0.0).

(Second Evaluation)

It is assumed that a large number of people have gathered at a colleague's home for his or her retirement party. Friends, family, and other colleagues are also invited to the party. It is assumed that during a party, five specific individuals (denoted by A, B, C, D, E) are seated and discussing with the robot 2. In this case, the dynamics of the group are described as follows.

D is a colleague who is the subject of a retirement party.
B is D's mentor when he was a graduate student under B.
D is A's boss who works at the same company.
A and E are colleagues and close friends.
A has heard about B from D. B is known to be a respected scholar in a certain academic field.
C is an old neighbor of B and is invited to the party.
C is also E's grandparent.

The robot 2 learns that such a party (social event) with many people will be held and guesses that the environmental score for use is env$_{score}$=(1.3, 1.0, 1.0). Because the robot 2 can identify each individual and collect a privacy profile, an initial trust score for the contact as shown in FIG. 18 can be acquired (a dominant score is highlighted). FIG. 18 is a diagram showing an example of an initial trust score in the second evaluation. In FIG. 18, a first row is an item, second and third rows are a case where A is a host, fourth and fifth rows are a case where B is a host, sixth and seventh rows are a case where C is a host, eighth and ninth rows are a case where C is a host, and tenth and eleventh rows are a case where E is a host. A third column is social trust, a fourth column is familial trust, a fifth column is professional trust, and a sixth column is an average value of the third to fifth columns.

Using the algorithm of the present embodiment, the group trust score of FIG. 19 is generated. FIG. 19 is a diagram showing an example of a group trust score based on FIG. 18. In FIG. 19, a dominant group score is highlighted as indicated by reference sign g121 and a second dominant score is highlighted as indicated by reference sign g122.

On the basis of these scores, there are several things capable of being determined by the robot 2. In FIG. 19, among all group participants, the trust score associated with social trust is higher than that of professional trust and higher than that of familial trust. The robot 2 may deduce that the topic of family is not significantly appropriate unless C or E speaks as the host. Alternatively, the robot 2 may deduce that it is appropriate to provide professional topics or prompts when D and A are talking but is not appropriate to provide professional topics or prompts when C is talking.

The evaluations and evaluation results described with reference to FIGS. 14 to 19 are examples and the present invention is not limited thereto.

As described above, in the present embodiment, the group trust score is used by the robot 2 to decide the group trust dynamics between groups of individuals. This trust score is derived from a variety of criteria, including trust relationships between individuals in various criteria, environmental sensing of the location of the robot 2 and its user, recommendations given to specific individuals, and the like.

In the present embodiment, the robot 2 can sense an environment in which its device is located and decide the type and location of the gathering. Also, the robot 2 tries to identify an individual in place using, for example, its modality, sensor, influence, intelligence, and the like.

When the identification of an individual is successful, the robot 2 is configured to acquire a privacy profile of the individual including a trust score for each contact destination. Unidentified individuals are treated as strangers to the group by the robot 2. Also, the robot 2 is configured to calculate a pair-specific trust score for each possible pairing combination in the group and with respect to a specific host individual. Also, the robot 2 is configured to process the score for each pair and generate a group trust score.

As described above, after the group trust score is processed, the robot 2 can better understand what the appropriate trust dynamics between individuals are. For example, if the robot 2, for example, understands that there is trust between two individuals and understands the nature and context of that trust, the robot 2 can be prompted to react, execute, and act in a more specific way when the individuals are present.

Although the trust score, the group trust score, and the environmental trust score are shown numerically in the above examples, the present invention is not limited thereto. As shown in FIG. 1, the trust score, the group trust score, and the environmental trust score may be words indicating magnitudes, for example, "High," "Avg," "Above-Avg," "Low," and the like.

Although a robot as an example of an information processing device has been described in the above-described example, the present invention is not limited thereto. The information processing device may be one that can be used for communication, for example, a portable terminal, a tablet terminal, a smartphone, a stuffed animal, a mascot, a doll, a figurine, and the like.

Although an example in which each robot performs processing has been described in the above-described example, the processing may be performed on the cloud.

A program for implementing all or some functions of the information processing system 1 in the present invention is recorded on a computer-readable recording medium, and the program recorded on the recording medium is read into a computer system and executed, such that all or some processing steps of the information processing system 1 may be performed. The "computer system" used here is assumed to include an operating system (OS) or hardware such as peripheral devices. The "computer system" is also assumed to include a WWW system equipped with a homepage provision environment (or display environment). Also, the "computer-readable recording medium" refers to a flexible disk, a magneto-optical disc, a read-only memory (ROM), a portable medium such as a compact disc-ROM (CD-ROM), or a storage device such as a hard disk embedded in the computer system. Furthermore, the "computer-readable recording medium" is assumed to include a medium that holds a program for a certain period of time, such as a volatile memory (random-access memory (RAM)) inside a computer system serving as a server or a client when the program is transmitted via a network such as the Internet or a communication circuit such as a telephone circuit.

Also, the above-described program may be transmitted from a computer system storing the program in a storage device or the like to another computer system via a trans-
mission medium or by transmission waves in a transmission
medium. Here, the "transmission medium" for transmitting
the program refers to a medium having a function of
transmitting information, as in a network (communication
network) such as the Internet or a communication circuit
(communication line) such as a telephone circuit. Also, the
above-described program may be a program for implement-
ing some of the above-described functions. Further, the
above-described program may be a so-called differential file
(differential program) capable of implementing the above-
described function in combination with a program already
recorded on the computer system.

Although modes for carrying out the present invention
have been described above using embodiments, the present
invention is not limited to the embodiments and various
modifications and substitutions can also be made without
departing from the scope and spirit of the present invention.

What is claimed is:

1. An information processing device comprising:
processing circuitry configured to:
calculate a group trust score indicating a relationship
    among a plurality of users in a group in which at least
    two users are present from a plurality of different trust
    levels and change a user information handling level
based on the group trust score,
recognize roles of the plurality of users and recognizes a
    host role among the plurality of users,
when the host role is recognized,
calculate a trust score of a relationship with the host role
from a user other than the host role for each pair of the
    other user and the host role, and
calculate the group trust score based on the trust score for
    each pair using a first equation:

$$GroupTrust_H = \frac{1}{|C|}\sum_{x \in C}env_{score} \odot (H_x \cdot (RMS_H + 1) + x_H + rec_x) \qquad (1)$$

wherein H denotes a set of all temporary hosts,
C denotes a collection of all other individuals in the
    group,
$H_x$ denotes a trust score of H for contact (a contact
    partner or another user) x,
$RMS_H$ denotes the root mean square calculation of $H_x$,
$rec_x$ denotes a recommendation trust score of individual
    x,
$env_{score}$ denotes an environmental score, and
$x_H$ denotes a trust score of x for H, and
where, when the host role is not recognized,
calculate the trust score of a mutual relationship of a pair
    of two users for each pair of two users from among the
    plurality of users, and
calculate the group trust score on the basis of the trust
score calculated for each pair using a second equation:

$$GroupTrust = \qquad (2)$$
$$\frac{1}{|C|} \cdot \frac{1}{|H|}\sum_{y \in H}\sum_{x \in C}env_{score} \odot (y_x \cdot (RMS_y + 1) + x_y + rec_x)$$

wherein
$y_x$ denotes a trust score of y for contact x,
$RMS_y$ denotes the root mean square of $y_x$,
$x_y$ denotes a trust score of x for y, and the calculations result in the group trust score indicating
    the relationship among the plurality of users in the
    group from the plurality of different trust levels and
    change a user information handling level on the basis of
    the group trust score; and
control access to resources based on the user information
    handling level according to the group trust score.

2. The information processing device according to claim
1, wherein the plurality of different trust levels include three
trust levels comprising a social trust level, a familial trust
level, and a professional trust level.

3. The information processing device according to claim
1, wherein the processing circuitry changes a weight of each
trust level among the plurality of different trust levels in
accordance with an environment of the user.

4. The information processing device according to claim
1, wherein the user information handling level is one of
allowance of use of all of the user information, allowance of
use of a part of the user information, and disallowance of
handling of all of the user information.

5. The information processing device according to claim
1,
wherein one of the users is a user selected by the infor-
    mation processing device, and
wherein the processing circuitry
calculates the trust score of the selected user, and
calculates the group trust score based on the trust score of
    the selected user.

6. The information processing device according to claim
1, comprising an environmental sensor configured to detect
environmental information of an environment in which the
plurality of users are present,
the processing circuitry
estimates the environment in which the plurality of users
    are present based on the environmental information
    detected by the environmental sensor and decides an
    environmental score for the environment in which the
    plurality of users are present based on an estimation
    result, and
calculates the group trust score based on the environmen-
    tal score.

7. An information processing method comprising:
calculating, by processing circuitry, a group trust score
    indicating a relationship among a plurality of users in
    a group in which at least two users are present from a
    plurality of different trust levels and changing a user
    information handling level based on the group trust
    score,
recognize, by the processing circuitry, roles of the plu-
    rality of users and recognizes a host role among the
    plurality of users,
when the host role is recognized,
calculate, by the processing circuitry, a trust score of a
    relationship with the host role from a user other than the
    host role for each pair of the other user and the host
    role, and
calculate, by the processing circuitry, the group trust score
    based on the trust score for each pair using a first
    equation:

$$GroupTrust_H = \frac{1}{|C|}\sum_{x \in C}env_{score} \odot (H_x \cdot (RMS_H + 1) + x_H + rec_x) \qquad (1)$$

wherein

H denotes a set of all temporary hosts,

C denotes a collection of all other individuals in the group, $H_x$ denotes a trust score of H for contact (a contact partner or another user) x, $RMS_H$ denotes the root mean square calculation of $H_x$, $rec_x$ denotes a recommendation trust score of individual x, $env_{score}$ denotes an environmental score, and $x_H$ denotes a trust score of x for H, and where, when the host role is not recognized, calculate, by the processing circuitry, the trust score of a mutual relationship of a pair of two users for each pair of two users from among the plurality of users, and calculate, by the processing circuitry, the group trust score on the basis of the trust score calculated for each pair using a second equation:

$$GroupTrust = \tag{2}$$
$$\frac{1}{|C|} \cdot \frac{1}{|H|} \sum_{y \in H} \sum_{x \in C} env_{score} \odot (y_x \cdot (RMS_y + 1) + x_y + rec_x)$$

wherein $y_x$ denotes a trust score of y for contact x, $RMS_y$ denotes the root mean square of $y_x$, $x_y$ denotes a trust score of x for y, and the calculations result in the group trust score indicating the relationship among the plurality of users in the group from the plurality of different trust levels and change a user information handling level on the basis of the group trust score; and control access to resources based on the user information handling level according to the group trust score.

8. A computer-readable non-transitory storage medium that stores a program for causing a computer of an information processing device to:

calculate a group trust score indicating a relationship among a plurality of users in a group in which at least two users are present from a plurality of different trust levels and change a user information handling level based on the group trust score, recognize roles of the plurality of users and recognizes a host role among the plurality of users, when the host role is recognized, calculate a trust score of a relationship with the host role from a user other than the host role for each pair of the other user and the host role, and calculate the group trust score based on the trust score for each pair using a first equation:

$$GroupTrust_H = \frac{1}{|C|} \sum_{x \in C} env_{score} \odot (H_x \cdot (RMS_H + 1) + x_H + rec_x) \tag{1}$$

wherein

H denotes a set of all temporary hosts,

C denotes a collection of all other individuals in the group, $H_x$ denotes a trust score of H for contact (a contact partner or another user) x, $RMS_H$ denotes the root mean square calculation of $H_x$, $rec_x$ denotes a recommendation trust score of individual x, $env_{score}$ denotes an environmental score, and $x_H$ denotes a trust score of x for H, and where, when the host role is not recognized, calculate the trust score of a mutual relationship of a pair of two users for each pair of two users from among the plurality of users, and calculate the group trust score on the basis of the trust score calculated for each pair using a second equation:

$$GroupTrust = \tag{2}$$
$$\frac{1}{|C|} \cdot \frac{1}{|H|} \sum_{y \in H} \sum_{x \in C} env_{score} \odot (y_x \cdot (RMS_y + 1) + x_y + rec_x)$$

wherein $y_x$ denotes a trust score of y for contact x, $RMS_y$ denotes the root mean square of $y_x$, $x_y$ denotes a trust score of x for y, and the calculations result in the group trust score indicating the relationship among the plurality of users in the group from the plurality of different trust levels and change a user information handling level on the basis of the group trust score; and control access to resources based on the user information handling level according to the group trust score.

\* \* \* \* \*